May 28, 1968     H. F. BROSE     3,385,769
APPARATUS FOR RECLAIMING WATER
Filed June 29, 1965     2 Sheets-Sheet 1

INVENTOR
HARLAN F. BROSE
BY Norman Friedland
ATTORNEY

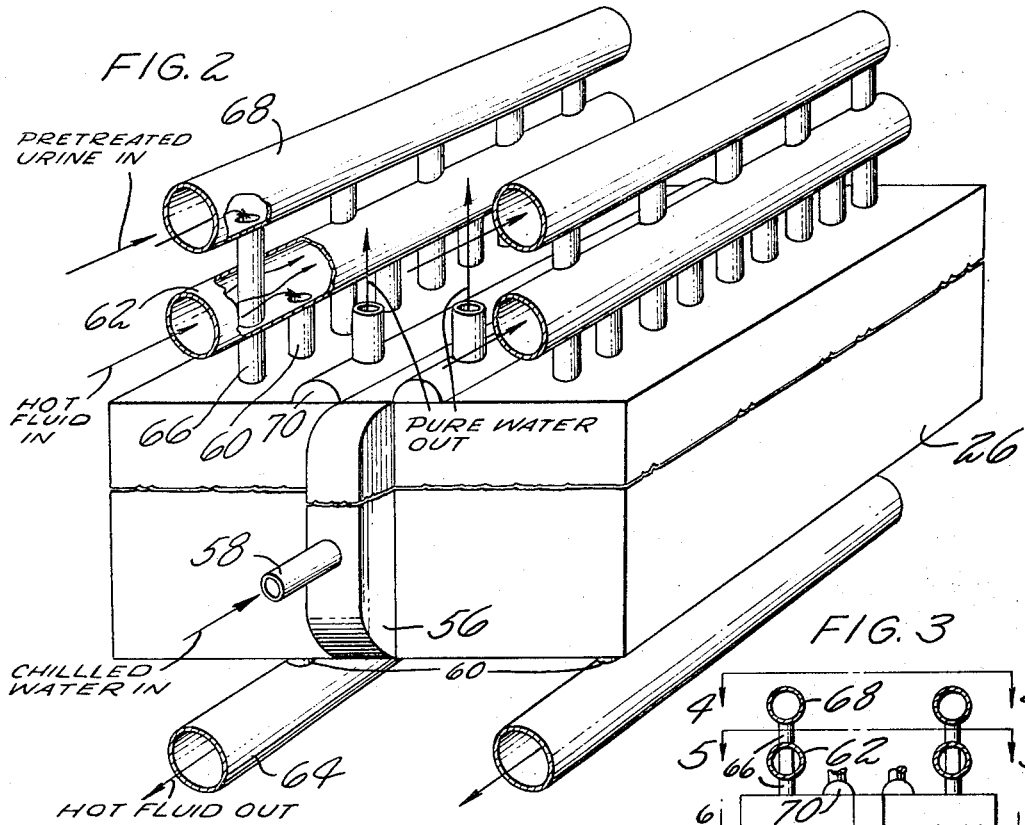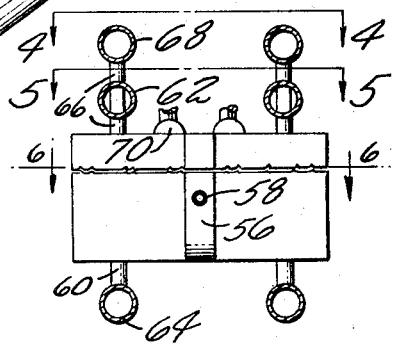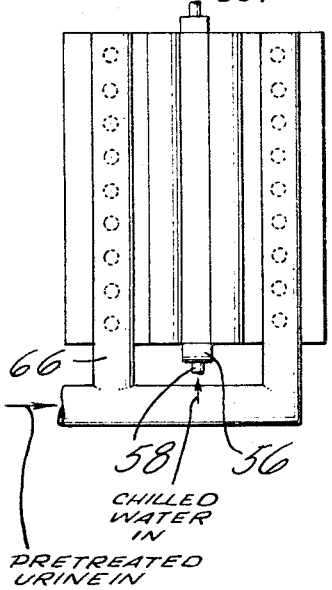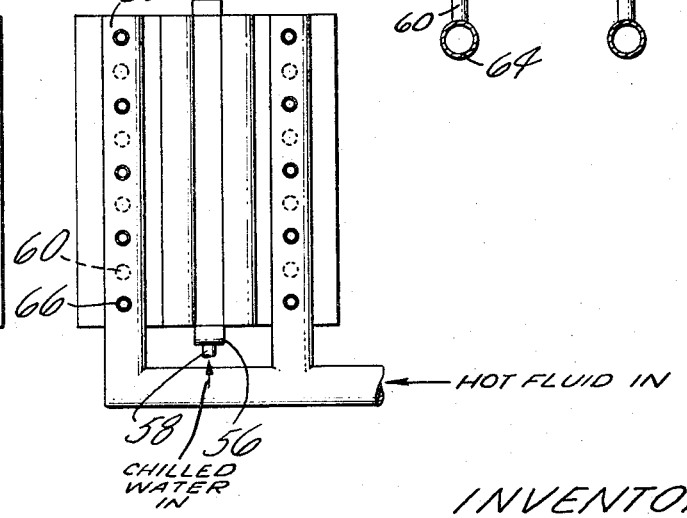

United States Patent Office 3,385,769
Patented May 28, 1968

3,385,769
APPARATUS FOR RECLAIMING WATER
Harlan F. Brose, Longmeadow, Mass., assignor to United Aircraft Corporation, East Hartford, Conn., a corporation of Delaware
Filed June 29, 1965, Ser. No. 468,065
5 Claims. (Cl. 202—197)

ABSTRACT OF THE DISCLOSURE

Heated urine which has been pretreated to fix the ammonia content and destroy the bacteria therein enters the apparatus and is caused to flow to a semipermeable membrane; pure water permeates the membrane; evaporation of the water occurs from the opposite surface of the membrane, and water vapor migrates across an air gap between the membrane and a porous plate. Since the porous plate is cooled below the temperature of the incoming heated urine, the water vapor condenses on the plate. The condensed pure water passes through the porous plate and into a pure water reservoir.

---

This invention relates to apparatus for recovering potable water from waste water.

It is an object of this invention to provide in mechanism as described means operable in a nongravitational or gravitational field for continuously recovering water from pretreated urine which mechanism is characterized as being simple and economical to manufacture, highly effective in the removal of contaminated constituents in the urine, requiring no power consumption (assuming the heating and cooling is available) yet capable of rugged use.

Other features and advantages will be apparent from the specification and claims and from the accompanying drawings which illustrate an embodiment of the invention.

FIGURE 2 is a perspective view illustrating the various passages to the water recovery apparatus.

FIGURE 3 is an end view of FIG. 2.

FIGURE 4 is a plan view taken along line 4—4 of FIG. 3.

FIGURE 5 is a sectional view taken along lines 5—5 of FIG. 3.

Figure 6:
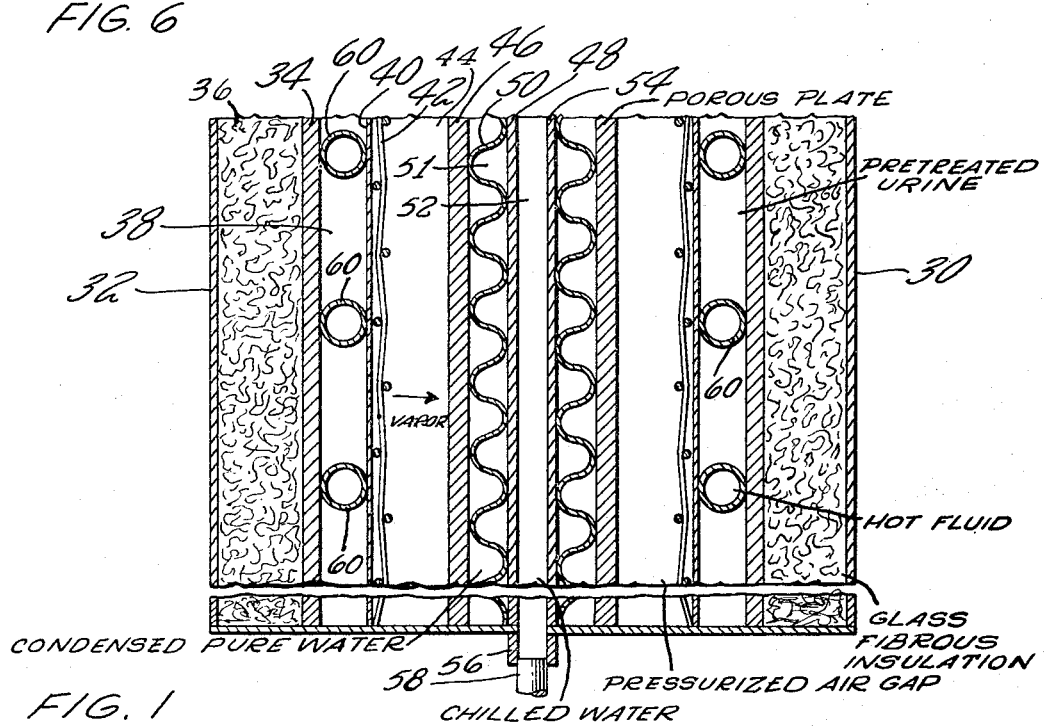
FIGURE 6 is a partial sectional view taken along lines 6—6 of FIG. 3.
Figure 1:
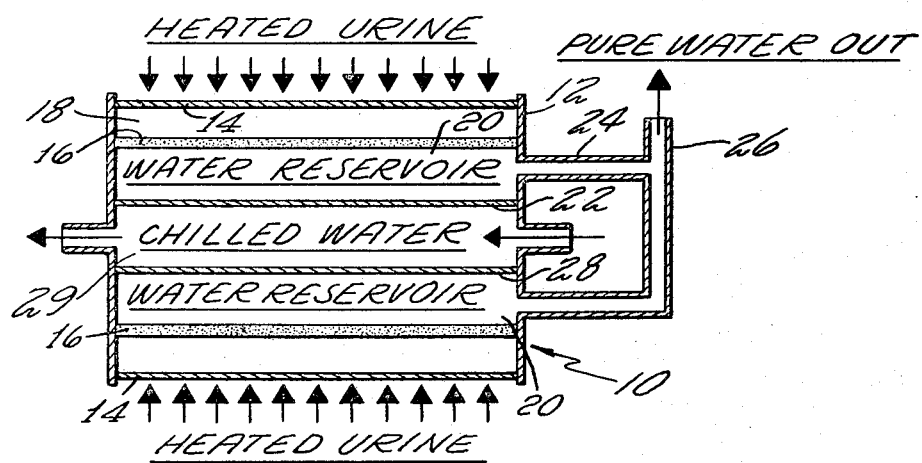
FIGURE 1 is a schematic illustration showing the principle of the invention.

Referring now specifically to FIG. 1, there is schematically illustrated the operating principles of the present invention which basically is comprised of a matrix, or core, divided into passes and cells defined by walls consisting of various materials to accomplish different functions.

The water reclamator generally indicated by numeral 10 is formed from an outer housing member 12 supporting a matrix or core comprising membrane 14 formed from suitable semipermeable material such as cellulose acetate. Porous plate 16, spaced from membrane 14 for defining cell 18 is formed from sintered metal such as nickel having pore sizes in the 1 to 20 micron range. Chamber 20 formed on the other side of porous plate 16 and defined by a nonporous flat plate 22 serves to collect the water separated from pretreated urine and may be considered as a water reservoir. Passages 24 and 26 communicate therewith and lead water to its ultimate destination, which in the case of a space craft may supply the occupants with drinking water. Spaced plates 22 and 28 (formed from same material as plate 22) define an open through-passage 29 for passing chilled water or fluid therethrough. The chambers and cells below 28 are symmetrical with those above so that for the sake of convenience a description thereof will be omitted.

The concept of this invention can probably best be understood by considering reclamator 10 as a "diffusion still." This invention combines the principle of reverse osmosis with evaporation and condensation. The reverse osmosis driving force is provided by temperature difference as opposed to a driving force of pressure difference used in sea water conversion plants. Pure water permeates membrane 14 and then a normal phase change technique is employed. The phase change for distilling the urine is accomplished in a completely passive manner. Urine pretreated in a manner discussed in the ASME paper 65–AV–24 by D. Putnam is introduced at an elevated temperature of approximately 130° F. The purpose of pretreating the urine is to kill bacteria and fix the ammonia in the urea which is volatile and would end up in the reclaimed water. For further information regarding the pretreatment of urine, reference should be made to U.S. application Ser. No. 458,156, filed on May 24, 1965, by D. F. Putnam, and assigned to same assignee. Evaporation occurs from the surface of membrane 14, and the water vapor migrates across the air gap in chamber 18, which is held at spacecraft cabin pressure, to the porous plate condenser 16 which is cooled to approximately 40° F. by cold transport fluid that passes through chamber 29. The 130° F. to 40° F. temperature difference between the point of evaporation and condensation causes a water vapor partial pressure gradient of 2 p.s.i. Calculations show that a maximum water flow of 0.5 lb./hr.-ft.$^2$ is possible. Experiments have verified the feasibility of the concept and a flow rate of .45 lb./hr.-ft.$^2$.

Referring now more particularly to the details of this invention and particularly to FIGS. 2 through 6 showing the water recovery unit as comprising core section 26 having a plurality of headers feeding fluid into the various chambers and cells of the core or matrix. Looking for the moment at FIG. 6 the core is shown as being comprised of a series of passages and cells preferably formed from flat plates extending through the length of the core and made from specific types of materials for performing the processes as described above. The core may be formed in a rectangular shaped box-like structure having suitable side, top, and bottom metallic corrosive resistant walls such as a high nickel content alloy for enclosing the various chambers and cells in the core. Spaced inwardly from side walls 30 and 32 is wall member 34 made from any metallic corrosive resisting material which serves to define an outer chamber 36 containing a suitable insulating material such as glass fibrous material. The adjacent chamber 38 is formed from wall 34 and membrane 40 which membrane is retained in position by a suitable wire mesh or screen 42. The next adjacent chamber 44 is formed between membrane 40 and porous plate 46. Another parallel nonporous plate 48 is spaced therefrom. Sandwiched between porous plate 46 and 48 is a thin fin element 50 which serves to increase the heat transfer between the adjacent fluids. Passage 52 formed between light plate member 54 and 48 is an open-ended passage for receiving the chilled water for defining a predetermined temperature drop across membrane 40 and porous plate 46.

The structure on the righthand side of chamber 52 is identical to the structure on the lefthand side thereof and for the sake of simplicity will not be described herein.

Looking for the moment now at FIGS. 1 through 5 the various communicating passages for directing fluid into and out of the core section of the water reclamator are shown. The water used in chamber 52 is introduced into header 56 through suitable piping 58 and passes through the center of the core and discharges in a similar type of header, not shown. Water is then continuously fed through the center part of the core for creating a heat sink centrally thereof at approximately 40° F. A hot transport fluid, which may be for example hot water, is admitted to the tubes 60 through manifold 62 and is collected in manifold 64 and serves to heat the urine to approximately 130° F. Cell 38 receives the pretreated urine from manifold 68 through pipes 66; one end of each pipe 66 communicates with manifold 68, and the other end of each pipe 66 terminates in cell 38. Chamber 44, like cell 38, is dead ended and serves to provide a gap between membrane 40 and porous plate 46 where evaporation and condensation take place. Hot water at approximately 130° F. permeating through the membrane 40 evaporates and after migrating through space 44 condenses on porous plate 46 as a result of the porous plate 46 being cooled by the plate-fin construction defined by plates 46, 48 and fin 50, the cooling provided by the fluid passing through passage 52. The water then passes through porous plate 46 into the channels defined by the fin section 50 where it is then collected into header 70. The driving force to make the water pass through porous plate 46 can be provided by either pressurizing chamber 44 or reducing the pressure of the reclaimed water reservoir 51. Air from chamber 44 will not leak into reservoir 51 after the porous plate 46 is wet due to the high capillary force resulting from the small pores in the plate. Water, however, passes through the plate freely as a result of the pressure differential between chamber 44 and reservoir 51. The pressure differential which can be utilized is up to approximately 10 p.s.i. A pressure of only say 2 p.s.i. would probably be high enough for spacecraft use. The salts collected in cell 38 will tend to build up after a given length of time which would require purging.

FIGURES 4 and 5 illustrate a suitable arrangement for interconnecting the urine and water manifolds 68 and 62.

It should be understood that the invention is not limited to the particular embodiments shown and described herein, but that various changes and modifications may be made without departing from the spirit or scope of this novel concept as defined by the following claims.

I claim:
1. Apparatus for recovering water from urine that has been pretreated to fix the ammonia and destroy the bacteria comprising an enclosed chamber, spaced wall members subdividing said chamber into at least three subchambers, one of said wall members being formed from a semipermeable membrane, the next adjacent wall member being formed from a porous plate, means for admitting pretreated urine into the subchamber defined by said semipermeable membrane and the adjacent wall of said enclosed chamber, means for pressurizing with a gas the subchamber defined by said semipermeable membrane and said porous plate, means for collecting water in the subchamber formed by said porous plate and the adjacent wall of said enclosed chamber, and means for applying a temperature differential across said subchambers for driving water vapor across said pressurized subchamber.

2. Apparatus for recovering water from urine that has been pretreated to fix the ammonia and destroy the bacteria comprising an enclosed chamber, spaced-wall members subdividing said chamber into subchambers, one of said wall members being formed from a semipermeable membrane, the next adjacent wall member being formed from a porous plate formed from sintered metal, means for creating a temperature difference of substantially 90° F. across said subchambers, means for admitting pretreated urine into the subchamber defined by said semipermeable membrane and the adjacent wall of said enclosed chamber, means for pressurizing with a gas the subchamber defined by said semipermeable membrane and said porous plate, and means for collecting water in the subchamber formed by said porous plate and the adjacent wall of said enclosed chamber.

3. Apparatus for recovering potable water from urine which urine has been pretreated to fix the ammonia in the urea comprising a housing having side walls and bottom and top walls together therewith defining a chamber, spaced partitioning elements disposed in parallel and aligned relation with each other in said chamber for defining subchambers, one of said partitioning elements being formed from a semipermeable membrane and defining with a side wall a subchamber for receiving pretreated urine, another of said partitioning elements being formed from a porous sintered metal and being spaced from said semipermeable membrane to define therewith the adjacent subchamber for receiving pressurized gas, another of said partitioning elements being formed from a nonporous material and disposed in said chamber to define together with said sintered metal partitioning element the next adjacent subchamber for receiving the potable water, and another of said partitioning elements being formed from another nonporous material disposed in said chamber so as to define with the other nonporous partitioning element the final adjacent chamber, means for conducting into and leading out of the final sub-chamber formed by said nonporous partitioning elements cool fluid, and tubes disposed in said urine filled subchamber for passing heated fluid therethrough for being in heat exchange relation with said urine-filled subchamber.

4. Apparatus for recovering potable water from urine which urine has been pretreated to fix the ammonia in the urea comprising a housing having side walls and bottom and top walls together therewith defining a chamber, spaced partitioning elements disposed in said chamber for defining subchambers, the first of said partitioning elements being formed from a semipermeable membrane, and defining with a wall of said housing, the first of said subchambers, the second of said partitioning elements being formed from a porous sintered metal and being disposed in said chamber parallel to and spaced from said semipermeable membrane to define therewith the adjacent subchamber for receiving pressurized gas, the third of said partitioning elements being formed from a nonporous material and disposed in said chamber to define together with said sintered metal partitioning element the next adjacent subchamber for receiving potable water, and the fourth of said partitioning elements being formed from another nonporous material disposed in said chamber so as to define with the other nonporous partitioning element the final adjacent chamber, means for conducting cool fluid into and out of said final subchamber and means for conducting hot fluid into and out of said first subchamber so as to create a temperature differential thereacross, and means for admitting urine into said first subchamber.

5. Apparatus for recovering potable water from urine which urine has been pretreated to fix the ammonia in the urea comprising a housing having side walls and bottom and top walls together therewith defining a chamber, spaced partitioning elements disposed in said chamber for defining subchambers, one of said partitioning elements being formed from a semipermeable membrane, another of said partitioning elements being formed from a porous sintered metal having a pore size in the range of 1 to 20 microns and being disposed in said chamber parallel to and spaced from said semi-permeable membrane to define therewith the adjacent subchamber for receiving pressurized air, another of said partitioning elements being formed from a nonporous material and disposed in said chamber to define together with said sintered metal partitioning element the next adjacent subchamber for receiving potable water, and another of said partitioning elements being formed from another nonporous material disposed in said chamber so as to define with the other nonporous partitioning element the final adjacent chamber, and means for conducting hot fluid into and from the subchamber defined by said semipermeable membrane and a wall of said housing and means for conducting cool fluid into and from the subchamber defined by the two nonporous partioning elements so as to create a temperature difference of substantially 90° F. thereacross, and means for admitting urine into the subchamber defined by said semipermeable membrane and a wall of said housing such that the hot fluid and the urine are not allowed to mix together.

References Cited

UNITED STATES PATENTS

| | | | |
|---|---|---|---|
| 2,445,350 | 7/1948 | Ginnings | 202—172 |
| 3,129,145 | 4/1964 | Hassler | 203—10 |
| 3,129,146 | 4/1964 | Hassler | 203—10 |
| 3,169,102 | 2/1965 | Weiswurm | 203—86 X |
| 3,340,186 | 9/1967 | Weyl | 203—10 X |

NORMAN YUDKOFF, *Primary Examiner.*

WILBUR L. BASCOMB, JR., *Examiner.*

J. SOFER, *Assistant Examiner.*